Aug. 17, 1971     M. D. MASSIE, JR     3,600,234
ELECTRONIC BATTERY CONDITION INDICATOR
Original Filed June 27, 1967
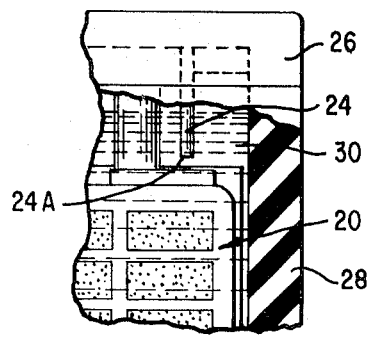
Fig. 2
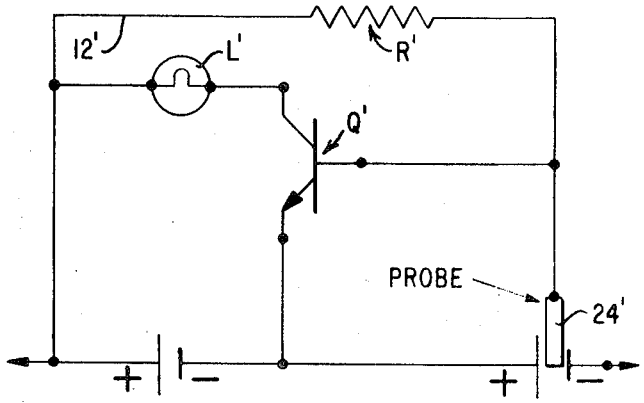
Fig. 3
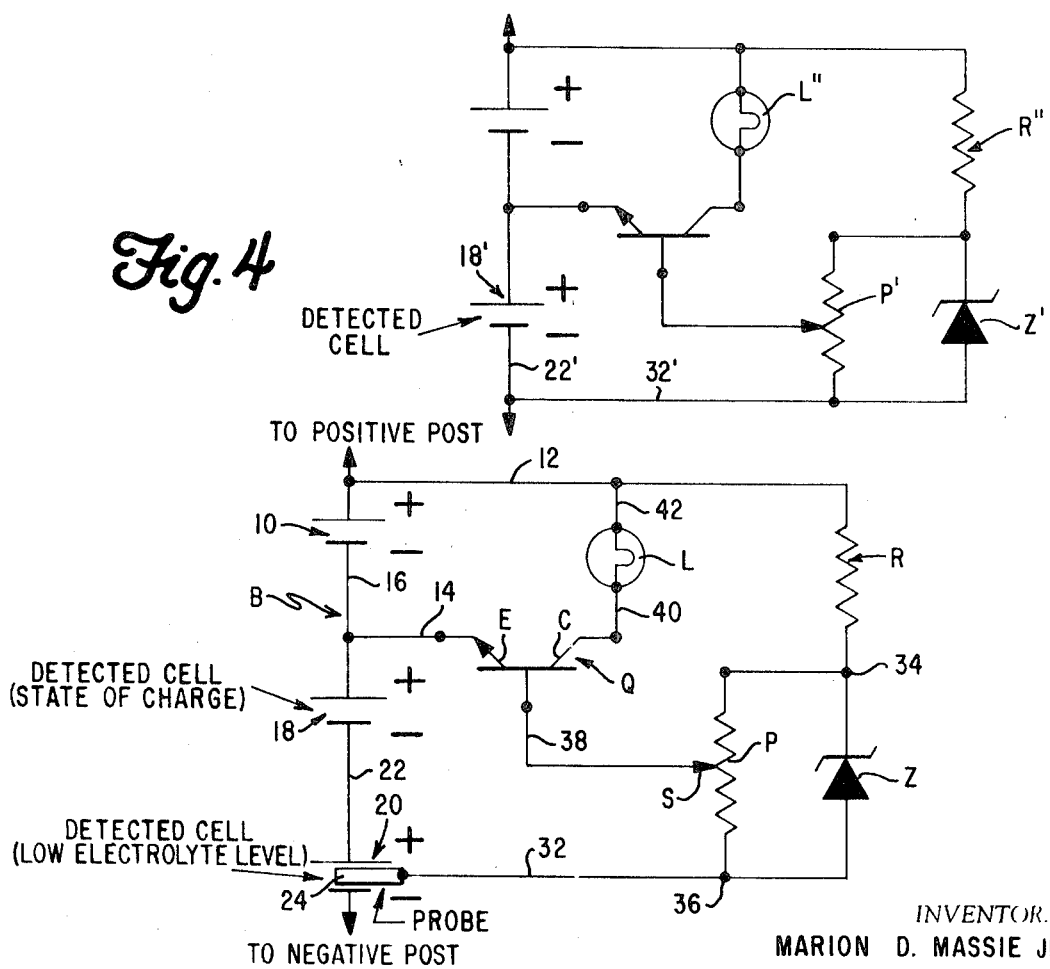
Fig. 4
Fig. 1
INVENTOR.
MARION D. MASSIE JR.
BY
H. Henry Stoltenberg
ATTORNEY United States Patent Office
3,600,234
Patented Aug. 17, 1971

3,600,234
ELECTRONIC BATTERY CONDITION INDICATOR
Marion D. Massie, Jr., Toledo, Ohio, assignor to
Eltra Corporation, Toledo, Ohio
Continuation of application Ser. No. 649,230, June 27,
1967. This application Jan. 9, 1970, Ser. No. 3,567
Int. Cl. H01m 31/04, 45/06
U.S. Cl. 136—182
3 Claims

ABSTRACT OF THE DISCLOSURE

Indicator for battery conditions showing the state of charge by a voltage comparison means, and electrolyte level in a cell by the use of a probe.

CROSS-REFERENCE TO RELATED APPLICATION

This is a continuation of my copending application Ser. No. 649,230, filed June 27, 1967, now abandoned.

There has been a continuing need for reliable indicators for disclosing to an operator the significant conditions in a battery, particularly when the battery is mounted under cover such as a floor or in a complete enclosure. The present invention provides an indicating means which will indicate the state of charge of a cell of the battery by a voltage comparison means and also indicate the electrolyte level in an adjacent cell by suitable visible indicating means or other desirable signalling devices.

It is therefore a principal object of this invention to provide a reliable indicating means which will indicate the state of charge of the battery and also to indicate the electrolyte level in a selected cell.

It is a further object of this invention to provide an indicator which will indicate the state of charge of a battery by a voltage comparison means.

It is a further object of this invention to provide an indicating means which will indicate the level of the electrolyte in a battery cell and cause a signal to be actuated when the level falls below a predetermined limit.

Other objects and advantages of this invention relating to the arrangement, operation and function of the related elements of the strructure, to various details of construction, to combinations of parts and to economies of manufacture will be apparent to those skilled in the art upon consideration of the following description and appended claim, reference being had to the accompanying drawings forming a part of this specification wherein like reference characters designate corresponding parts in the several views.

Referring to the drawings:

FIG. 1 is a schematic diagram of connections of a signalling device for batteries such as a lead acid battery which indicates the state of charge of the battery as well as the electrolyte level in a cell.

FIG. 2 is a sectional elevation of a cell, of a battery showing a probe cooperating with the electrolyte, FIG. 3 is a schematic diagram of connections of a modification of the signalling device which indicates only the level of the electrolyte in the cell of the battery, and FIG. 4 is a schematic diagram of connections of another modification of the signalling device which indicates only the state of charge of the cell of the battery.

Referring to the drawings, particularly to FIG. 1, a multicell battery B is shown which consists of three cells connected in series, preferably of the lead acid type having an electrolyte and the usual lead electrodes to produce a cell voltage of approximately 2 volts. The physical details of the cell construction are well known in the art and need not be described in further detail. The upper cell 10 has wire 12 in contact with its positive terminal, while wire 14 is connected to the cell interconnector 16 between cell 10 and an intermediate cell 18, whose state of charge is to be detected and indicated as will appear hereinafter.

The cell 18 and a lower cell 20 are interconnected by wire 22, so that all three cells 10, 18 and 20 are series connected to make their individual voltages additive. The cell 20 is provided with a metal probe 24 to contact the acid electrolyte in the cell and is made of an acid resistant material such as lead or a lead alloy. The probe 24 is affixed to a cover 26 for the cell (FIG. 2) container 28, and is mounted to extend down from the cover 26 into the free upper surface of the electrolyte 30, so that its lower terminus 24A will break electrical contact with the electrolyte 30 when the level of the electrolyte has receded to its lowest safe level as predetermined by its condition of use. A wire 32 is connected to the probe 24 as shown and it is to be understoood that the methods whereby wires 12, 14 and 32 are connected to their respective battery elements may vary widely by any of the methods known in the prior art.

A reference voltage between wires 32 and 38 in controlled by a potentiometer P which is connected in parallel to a Zener diode Z at points 34 and 36. The slide S of the potentiometer is connected to the base of transistor Q by wire 38 which is preferably of NPN type although the circuit can easily be modified to use a PNP type, or other types should such be desirable.

The emitter E of the transistor Q is connected to the wire 14, while the collector C is connected by wire 40 to a light bulb L whose opposite terminal is connected to wire 12 by wire 42.

With the circuit shown in FIG. 1, with the probe 24 immersed in the electrolyte 30 of the cell 20 and in electrical circuit therewith, the transistor Q compares a reference voltage as controlled by the slide S on the potentiometer P with a cell voltage, which is the sum of the voltage cell 18 combined with a partial voltage of cell 20 found between its positive terminal and the probe 24. The current flows from cell 10 through wire 12 to resistance R, through Zener diode Z and potentiometer P to wire 32 back to probe 24 to complete the circuit through the cell connectors 16 and 22.

This current flow through the circuit elements creates the reference voltage which the transistor Q compares with the combined cell voltages as already described. When this combined cell voltage falls below the reference voltage, the conditions in the transistor Q allow conduction, the amount of conduction being proportionate to the voltage difference and light bulb will light up, its brillance becoming greater as the voltage difference becomes greater. This indicates to the operator that the cell voltages are below normal, assuming that the probe 24 is still immersed in the electrolyte 30.

When the electrolyte 30 recedes and its level falls below the point of contact with the probe 24, the light bulb L will also light by having the current flowing in wire 12 and resistance R diverted to the base of the transistor Q causing it to become conductive to light the bulb L. This will indicate that the level of electrolyte is possibly low and should be checked. Of course, if in checking it is found that the electrolyte level is normal and the bulb L still lights, then it is obvious that the state of charge of the battery is below normal as determined by the combined cell voltages as compared with the voltage reference.

In the modification shown in FIG. 3 only the electrolyte level is capable of being indicated by the bulb L', so that when the electrolyte is no longer contacting the probe 24' the current flowing in wire 12' is diverted to the base of the transistor Q' causing it to conduct to light the bulb L'.

In the modification shown in FIG. 4 only the state of charge of the intermediate cell 18' can be sensed and the cell 20 of FIG. 1 is dispensed with entirely and the wire 32' is connected directly to wire 22', which makes the circuits shown in FIGS. 1 and 4 the same. This change in the circuit requires a change in the Zener diode voltage but in other respects the circuit performs as before.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What I claim is:

1. In combination, a condition indicating device and a multiple cell battery, said device comprising a transistor having emitter, collector and control electrodes, a current responsive lamp connected in series with the collector of said transistor and said battery whereby conduction by said transistor will energize said lamp, means including a Zener diode connected to said battery for providing a constant reference voltage, means applying at least a portion of the voltage difference between the reference voltage and the voltage of a first predetermined cell in said battery between the emitter and control electrodes of said transistor whereby said transistor conducts to energize said lamp when the voltage of said first cell drops below a predetermined low voltage, and means sensing the electrolyte level in a said second predetermined cell in said battery for disconnecting the voltage difference from between the emitter and the control electrodes of said transistor when the electrolyte in said second cell falls below a predetermined level, thereby also causing said transistor to conduct to energize said lamp.

2. The combination of claim 1 wherein said means for providing a reference voltage includes a variable resistance voltage divider connected in parallel with said Zener diode whereby the reference voltage may be selectively varied.

3. The combination of claim 1 wherein said electrolyte level sensing means is a battery probe positioned in said second battery cell and extending downwardly into said cell to said predetermined level.

References Cited

UNITED STATES PATENTS

| | | | |
|---|---|---|---|
| 1,338,170 | 4/1920 | Carlon | 136—182.31 |
| 1,464,510 | 8/1923 | Simpson | 136—182.3 |
| 1,594,814 | 8/1926 | Brodin et al. | 136—182.31 |
| 2,560,962 | 7/1951 | Kopper et al. | 136—182.31 |
| 3,302,091 | 1/1967 | Henderson | 136—182 |
| 3,314,060 | 4/1967 | MacKenzie et al. | 340—244 |
| 3,321,754 | 5/1967 | Grimm et al. | 340—249 |
| 3,343,152 | 9/1967 | Hart | 340—249 |
| 3,349,386 | 10/1967 | Zug | 340—249 |
| 3,383,580 | 5/1968 | Wallace | 324—29.5X |

DONALD L. WALTON, Primary Examiner

U.S. Cl. X.R.

340—249